US006374473B1

(12) United States Patent
Edwards

(10) Patent No.: US 6,374,473 B1
(45) Date of Patent: Apr. 23, 2002

(54) VALVE SPRING COMPRESSOR

(76) Inventor: Matthew G. Edwards, Rte. 1, Box G-6, Thebes, IL (US) 62990

( * ) Notice: Subject to any disclaimer, the term of this patent is extended or adjusted under 35 U.S.C. 154(b) by 0 days.

(21) Appl. No.: 09/753,575

(22) Filed: Jan. 4, 2001

(51) Int. Cl.[7] .................................................. B23P 19/04
(52) U.S. Cl. .......................................................... 29/220
(58) Field of Search .......................... 29/215, 219, 220, 29/216, 267

(56) References Cited

U.S. PATENT DOCUMENTS

| | | | | |
|---|---|---|---|---|
| 1,961,876 A | | 6/1934 | Gardella | |
| 2,263,803 A | | 11/1941 | Gizaham | |
| 2,524,949 A | | 10/1950 | Applegate | |
| 2,627,653 A | * | 2/1953 | Wisner | 29/220 |
| 2,940,166 A | | 6/1960 | Moore | |
| 4,223,431 A | | 9/1980 | Skeels | |
| 4,446,608 A | * | 5/1984 | Johnson | 29/220 |
| 5,339,515 A | * | 8/1994 | Brackett et al. | 29/219 |

* cited by examiner

*Primary Examiner*—Robert C. Watson
(74) *Attorney, Agent, or Firm*—Stephen R. Greiner

(57) ABSTRACT

A valve spring compressor of uncomplicated construction. The valve spring compressor includes a lever arm and an attaching member pivotally and releasably secured to the front end of the lever arm. The attaching member has a threaded portion and a first carrier portion attached to the threaded portion. The first carrier portion has a pair of first retaining legs extending upwardly from the top of the threaded portion that are positioned on opposite sides of the lever arm and are secured thereto. A compressing member is pivotally and releasably secured to the lever arm between its front and rear ends. The compressing member includes an inverted cup portion having a ring and a peripheral flange extending downwardly therefrom. A second carrier portion is attached to the inverted cup portion and has a pair of second retaining legs extending upwardly from the top of the threaded portion. The second retaining legs are positioned on opposite sides of the lever arm and are secured thereto.

5 Claims, 1 Drawing Sheet

VALVE SPRING COMPRESSOR

FIELD OF THE INVENTION

The present invention relates generally to engine valve unit pullers or appliers that are lever operated.

BACKGROUND OF THE INVENTION

The typical, four-stroke, internal combustion engine has a pair of valves associated with each cylinder for admitting fuel and exhausting waste gasses. Each valve is movable within the cylinder head and is held firmly against its seat by a coiled spring. The spring presses against the cylinder head and against a washer which is secured to the valve's stem by collets. An overhead camshaft, or tappets and rockers manipulated by a camshaft, are used to push the valve downwardly against the force of the spring to open the valve.

Over time, engine valves wear and their parts must be serviced or replaced. To disassemble a valve, the spring must first be compressed so that the collets associated therewith can be removed. Once removal of the collets has been accomplished, the valve may be readily disassembled.

Tools have been proposed for forcing the washer atop the spring toward the cylinder and valve heads. None has seen widespread use, perhaps because they have been cumbersome in their operation or because they have not been usable with engines of more than one manufacturer or model.

SUMMARY OF THE INVENTION

In light of the problems associated with the known tools for disassembling valves of internal combustion engines, it is a principal object of the invention to provide a valve spring compressor of uncomplicated construction that can be utilized with engines having a variety of configurations and being made by a variety of manufacturers. Thus, it is believed that the tool will have near universal appeal to engine mechanics.

It is an object of the invention to provide improved elements and arrangements thereof in a valve spring compressor for the purposes described which is lightweight in construction, inexpensive to manufacture, and dependable in use.

Briefly, the valve spring compressor in accordance with this invention achieves the intended objects by featuring a lever arm with an attaching member pivotally and releasably secured to its front end. The attaching member has a threaded portion and a first carrier portion attached thereto. The first carrier portion has a pair of first retaining legs extending upwardly from the threaded portion positioned on opposite sides of the lever arm. A compressing member is pivotally and releasably secured to the lever arm between its front and rear ends. The compressing member includes an inverted cup portion with a ring and a downwardly extending, peripheral flange. A second carrier portion is attached to the inverted cup portion and has a pair of second retaining legs extending upwardly from the threaded portion. The second retaining legs are positioned on opposite sides of the lever arm.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figures 1, 2, 3, 4:
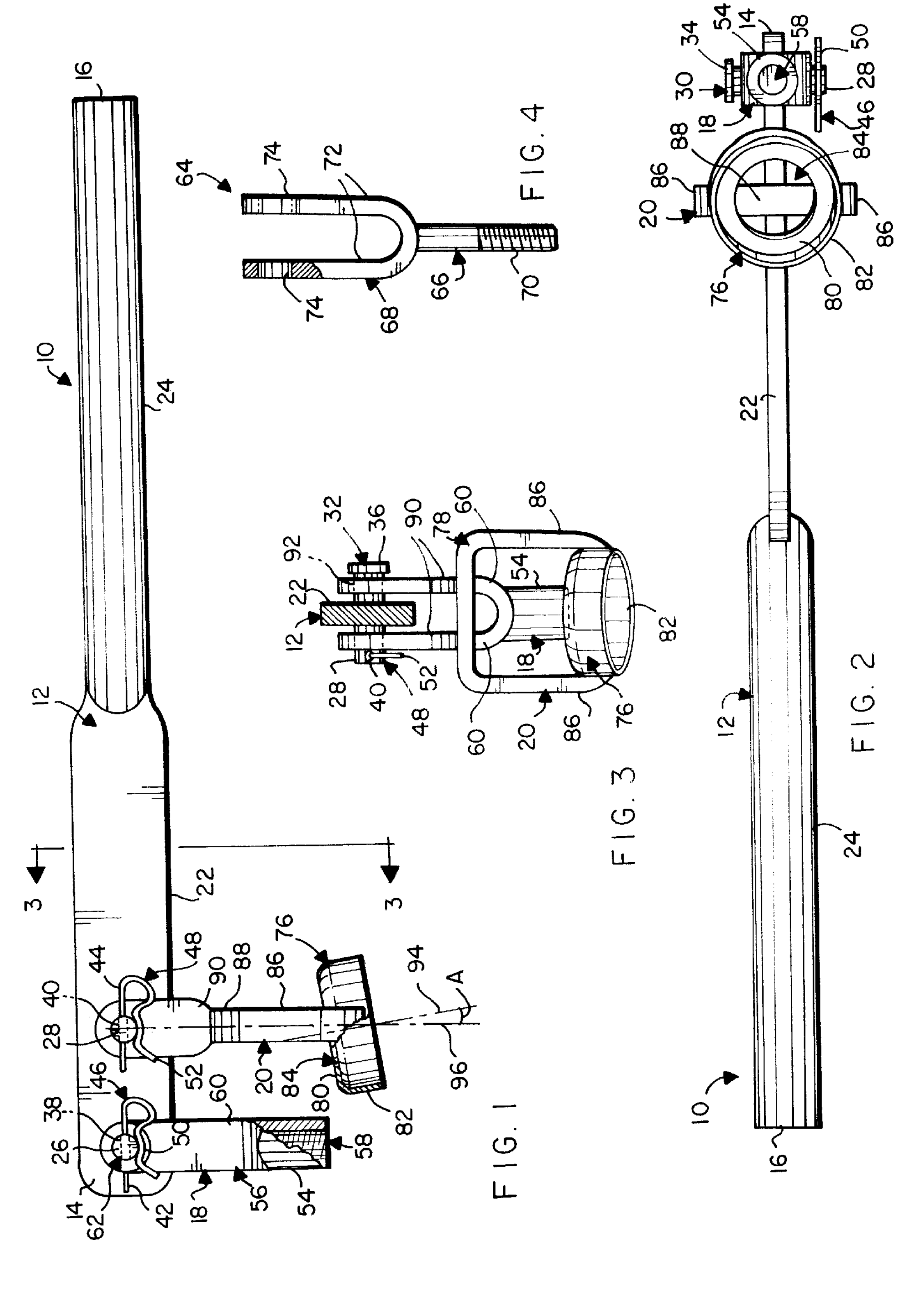
FIG. 1 is a side view of a valve spring compressor in accordance with the present invention with portions broken away to reveal details thereof.
FIG. 2 is a bottom view of the valve spring compressor of FIG. 1.
FIG. 3 is a cross-sectional view taken along line 3—3 of FIG. 1.
FIG. 4 is a front view of an alternative attaching member that can be used with the valve spring compressor.

Referring now to the FIGS., a valve spring compressor in accordance with the present invention is shown at 10. Spring compressor 10 includes a lever arm 12 having a front end 14 and a rear end 16. An attaching member 18 is pivotally secured to front end 14 of lever arm, 12. Between front end 14 and rear end 16 of lever arm 12 is pivotally secured a compressing member 20.

Lever arm 12 is formed from the piece of stiff tubing about one foot (30 cm) in length. The tubing piece is collapsed from front end 14 to a location adjacent its midpoint so as to provide lever arm 12 with a narrowed portion 22 for easy fastening of attaching and compressing members 18 and 20. The uncollapsed portion of the tubing piece forms a handle portion 24 extending inwardly from rear end 16 which may be gripped by a user.

Narrowed portion 22 of lever arm 12 is provided with a pair of transverse apertures (not shown) sized to snugly receive the elongated shafts 26 and 28 of pivot pins 30 and 32. At one end of shafts 26 and 28 are enlarged heads 34 and 36 sized to prevent their passage through the apertures in narrowed portion 22. Transverse bores 38 and 40 are provided at the other ends of shafts 26 and 28 into which the straight parts 42 and 44 of cotter pins 46 and 48 can be selectively inserted. As shown, the sinuous portions 50 and 52 of cotter pins 46 and 48 engage the sides of shafts 26 and 28 to secure such in place.

Attaching member 18 includes a threaded portion 54 attached to the bottom of a U-shaped carrier portion 56. Threaded portion 54 has a threaded bore 58 that extends upwardly from the bottom end thereof and is sized for threaded engagement with a threaded stud extending upwardly from an engine head (not shown). Carrier portion 56 includes a pair of retaining legs 60 that extends upwardly from the top of threaded portion 54 and is spaced from one another at a distance sufficient to receive narrowed portion 22 therebetween. The top ends of legs 60 are provided with axially aligned apertures 62 sized for the snug passage of shaft 26.

An alternative attaching member 64 is shown in FIG. 4. Attaching member 64 includes a threaded portion 66 attached to the bottom of a U-shaped carrier portion 68. Threaded portion 66 has a threaded rod 70 that is sized for threaded engagement with a socket in the top of an engine head (not shown). Carrier portion 68 includes a pair of retaining legs 72 that extends upwardly from the top of threaded portion 66 and is spaced to receive narrowed portion 22 therebetween. The top ends of legs 72 are provided with axially aligned apertures 74 sized for the snug passage of shaft 26.

Compressing member 20 includes an inverted cup portion 76 attached to the bottom of an H-shaped carrier portion 78.

As shown, cup portion 76 includes a ring 80 having a peripheral flange 82 extending downwardly therefrom. Ring 80 has an opening 84 at its center. Extending upwardly from opposite sides of cup portion 76, and attached to peripheral flange 82, are a pair of lower retaining legs 86 connected at their top ends by a crossbar 88. Projecting upwardly from crossbar 88 is a pair of upper retaining legs 90 being spaced from one another at a distance sufficient to receive narrowed portion 22 therebetween. The top ends of legs 90 are provided with axially aligned apertures 92 sized for the snug passage of shaft 28.

It should be noted that cup portion 76 is tipped slightly so that it opens, at its bottom, toward rear end 16 of lever arm 12. In this regard, it may be seen in FIG. 1 that cup portion 76 has a central axis 94 about which it is symmetrical. Axis 94 is inclined at an angle "A" of about ten degrees to the longitudinal axis 96 of carrier portion 78. Axis 96 extends through the centers of both aperture 92 and cup portion 76. Such a tip or tilt makes access to a valve spring easier and permits cup portion 76 to be pressed flat against the top of a valve spring when pivot pin 32 is spaced widely from pivot pin 30 for greater leverage.

To use valve spring compressor 10, socket portion 54 of attaching member 18 is positioned atop a chosen cylinder head bolt or stud (not shown) and screwed thereon. (Note: should studs not be present, threaded end 70 of attaching member 64 may be screwed into holes in the cylinder head from which the studs have been removed.) Lever arm 12, now being free to pivot on pin 30 in a vertical plane, is raised and cup portion 76 of compressing member 20 is positioned atop a valve spring-retaining washer (not shown). Then, lever arm 12 is pivoted downward by pressure upon handle portion 24 against the upward pressure of a valve spring (not shown) to give access to the associated collets (not shown) in opening 84. When downward pressure is released after the collets have been on removed, the valve may be easily disassembled by lifting its parts. The rearward tilt of cup portion 76 presents these parts toward a user positioned rearward of handle portion 24 saving time and effort when numerous valves are being serviced.

Of course, valves may be reassembled with equal ease simply by reversing the steps outlined in the previous paragraph. Both assembly and disassembly of a valve requires seconds to complete.

It is intended that spring compressor 10 will be made and sold as a kit of sorts. Thus, a plurality of attaching members 18 and 64 with different thread diameters will be provided with a single lever arm 12 so that all makes and models of engines with their different stud and thread sizes can be accommodated. Similarly, compressing members 20 with different size cup portions 76 would be provided with a lever arm 12. Replacement of attaching members 18 or 64 and compressing member 20 would be readily accomplished by removing cotter pins 46 and 48.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A valve spring compressor, comprising:

a lever arm having a front end and a rear end;

an attaching member pivotally and releasably secured to said front end of said lever arm, said attaching member including:

a threaded portion; and, a first carrier portion attached to said threaded portion, said first carrier portion having a pair of first retaining legs extending upwardly from said threaded portion, said first retaining legs being positioned on opposite sides of said lever arm and being secured thereto; and, a compressing member pivotally and releasably secured to said lever arm between said front end and said rear end, said compressing member including:

an inverted cup portion having a ring with an opening at the center thereof and a peripheral flange extending downwardly therefrom; and, a second carrier portion attached to said inverted cup portion, said first carrier portion having a pair of second retaining legs extending upwardly from said threaded portion, said second retaining legs being positioned on opposite sides of said lever arm and being secured thereto.

2. The valve spring compressor according to claim 1 wherein said threaded portion has a threaded bore extending upwardly from the bottom thereof sized for threaded engagement with a threaded stud on an engine head.

3. The valve spring compressor according to claim 1 wherein said threaded portion has a threaded rod for threaded engagement with a threaded socket on an engine head.

4. The valve spring compressor according to claim 1 wherein said cup portion has a central axis and said second carrier portion has a longitudinal axis and said central axis is inclined at an angle relative to said longitudinal axis.

5. The valve spring compressor according to claim 4 wherein said central axis is inclined at an angle of about ten degrees relative to said longitudinal axis.

* * * * *